(12) United States Patent
Abraham et al.

(10) Patent No.: US 9,281,924 B2
(45) Date of Patent: Mar. 8, 2016

(54) METHOD AND APPARATUS FOR GENERATING VARIOUS TRANSMISSION MODES FOR WLAN SYSTEMS

(75) Inventors: Santosh Paul Abraham, San Diego, CA (US); Vincent Knowles Jones, IV, Redwood City, CA (US); Hemanth Sampath, San Diego, CA (US); Didier Johannes Richard Van Nee, De Meern (NL); Sameer Vermani, San Diego, CA (US); Stephen J. Shellhammer, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 13/445,753

(22) Filed: Apr. 12, 2012

(65) Prior Publication Data
US 2012/0263156 A1    Oct. 18, 2012

Related U.S. Application Data

(60) Provisional application No. 61/475,153, filed on Apr. 13, 2011.

(51) Int. Cl.
*H04W 4/00*       (2009.01)
*H04L 5/00*       (2006.01)
*H04W 72/04*      (2009.01)
*H04W 16/14*      (2009.01)
*H04W 84/12*      (2009.01)

(52) U.S. Cl.
CPC ............ *H04L 5/0023* (2013.01); *H04L 5/0044* (2013.01); *H04W 16/14* (2013.01); *H04W 72/044* (2013.01); *H04W 72/0453* (2013.01); *H04W 84/12* (2013.01)

(58) Field of Classification Search
CPC .................. H04W 74/004; H04W 74/0816
USPC ......................................................... 370/338
See application file for complete search history.

(56) References Cited

U.S. PATENT DOCUMENTS

| 7,613,243 B2 | 11/2009 | Ouyang et al. |
| 7,822,135 B2 | 10/2010 | Sadowsky et al. |
| 7,881,390 B2 | 2/2011 | Sadowsky et al. |

(Continued)

FOREIGN PATENT DOCUMENTS

| EP | 1501251 A2 | 1/2005 |
| EP | 1533964 A2 | 5/2005 |

(Continued)

OTHER PUBLICATIONS

"IEEE Std 802.11z: IEEE Standard for Information Technology—Amendment 7: Extensions to Direct-Link Setup", IEEE Computer Society 3 Park Avenue New York, NY 10016-5997 http://ieeexplore.ieee.org/xpl/freeabs_alljsp"amumber=5605400 Oct. 14, 2010, 96 pages.

(Continued)

*Primary Examiner* — Guang Li
*Assistant Examiner* — Joe Combs
(74) *Attorney, Agent, or Firm* — Patterson & Sheridan, LLP

(57) ABSTRACT

Certain aspects of the present disclosure relate to a technique for generating 40+40 MHz and 40+40+40+40 MHz transmission modes for IEEE 802.11 wireless communications systems using Very High Throughput (VHT) waveforms with application to Television White Space (TVWS) spectrum.

49 Claims, 12 Drawing Sheets

(56) References Cited

U.S. PATENT DOCUMENTS

| | | | |
|---|---|---|---|
| 8,773,969 B1* | 7/2014 | Zhang et al. | 370/208 |
| 2005/0152473 A1* | 7/2005 | Maltsev | H04L 27/26 |
| | | | 375/299 |
| 2006/0115012 A1* | 6/2006 | Sadowsky et al. | 375/260 |
| 2007/0140364 A1* | 6/2007 | Ouyang et al. | 375/260 |
| 2007/0147521 A1* | 6/2007 | Horng et al. | 375/260 |
| 2010/0310003 A1 | 12/2010 | Lauer et al. | |
| 2011/0026623 A1* | 2/2011 | Srinivasa et al. | 375/260 |
| 2011/0075607 A1* | 3/2011 | Kim et al. | 370/328 |
| 2011/0194544 A1 | 8/2011 | Yang et al. | |
| 2011/0199968 A1 | 8/2011 | Kim et al. | |
| 2011/0222519 A1* | 9/2011 | Liao | H04L 27/2621 |
| | | | 370/338 |
| 2011/0249660 A1* | 10/2011 | Noh | H04L 5/0023 |
| | | | 370/338 |
| 2011/0255577 A1* | 10/2011 | Agee et al. | 375/219 |
| 2012/0051454 A1* | 3/2012 | Zheng et al. | 375/295 |
| 2012/0076219 A1* | 3/2012 | Srinivasa et al. | 375/260 |
| 2012/0177019 A1* | 7/2012 | Zhang | 370/338 |
| 2012/0207036 A1* | 8/2012 | Ong et al. | 370/252 |
| 2012/0207106 A1* | 8/2012 | Banerjea et al. | 370/329 |
| 2012/0230448 A1* | 9/2012 | Kang et al. | 375/295 |
| 2012/0307921 A1* | 12/2012 | Ulmer-Moll | H04B 3/542 |
| | | | 375/259 |

FOREIGN PATENT DOCUMENTS

| | | |
|---|---|---|
| WO | WO2011008740 A2 | 1/2011 |
| WO | WO-2011008776 A1 | 1/2011 |
| WO | WO-2012091478 A2 | 7/2012 |
| WO | WO-2012158961 A1 | 11/2012 |

OTHER PUBLICATIONS

IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).

Stacey, Robert (Intel), et al., "ACcord MAC and PHY Specification" D0.62, Jan. 2010.

International Search Report and Written Opinion—PCT/US2012/033618—ISA/EPO—Aug. 1, 2012.

* cited by examiner

| Bit | Field | Bit Allocation | Description |
|---|---|---|---|
| VHT-SIG-A1 | | | |
| B0-B1 | BW | 2 | Set to 0 for 20 MHz, 1 for 40 MHz, 2 for 80 MHz, 3 for 160 MHz and 80+80 MHz |
| B2 | Reserved | 2 | Reserved for possible expansion of BW field. Set to 1. |

| B0 | B1 | B2 | Bandwidth Indication |
|---|---|---|---|
| 0 | 0 | 1 | 20 MHz |
| 0 | 1 | 1 | 40 MHz |
| 1 | 0 | 1 | 80 MHz |
| 1 | 1 | 1 | 160 MHz, 80+80 MHz |
| 1 | 0 | 0 | 40+40 MHz |
| 1 | 1 | 0 | 40+40+40+40 MHz |
| X | X | 0 | All other modes reserved |

FIG. 4

| Timing Parameter | Expression | Value (6 MHz TV BW) 5MHz Baseband | Value (6 or 7 MHz TV BW) 6MHz Baseband | Value (7 or 8 MHz TV BW) 7MHz Baseband | Value (8MHz TV BW) 8MHz Baseband |
|---|---|---|---|---|---|
| aCCATime | One symbol time | 32 μs | 27 μs | 23 μs | 20 μs |
| aRxTxTurnaroundTime | Based on RF circuits | 2 μs | 2 μs | 2 μs | 2 μs |
| aAirPropagationTime | RF Propagation Time | 1 μs | 1 μs | 1 μs | 1 μs |
| aMACProcessingDelay | MAC Processing Time | 2 μs | 2 μs | 2 μs | 2 μs |
| aSlotTime | aCCATime + aRxTxTurnaroundTime + aAirPropagationTime + aMACProcessingDelay | 37 μs | 32 μs | 28 μs | 25 μs |
| SIFS | One slot time | 37 μs | 32 μs | 28 μs | 25 μs |
| DIFS | SIFS + 2 aSlotTime | 111 μs | 96 μs | 84 μs | 75 μs |

FIG. 10

METHOD AND APPARATUS FOR GENERATING VARIOUS TRANSMISSION MODES FOR WLAN SYSTEMS

CLAIM OF PRIORITY UNDER 35 U.S.C. §119

The present Application for Patent claims benefit of U.S. Provisional Patent Application Ser. No. 61/475,153, entitled, "40+40 MHz and 40+40+40+40 MHz transmission modes for IEEE 802.11 wireless systems using IEEE 802.11ac waveforms with application to IEEE 802.11af", filed Apr. 13, 2011 and assigned to the assignee hereof and hereby expressly incorporated by reference herein.

BACKGROUND

1. Field

Certain aspects of the present disclosure generally relate to wireless communications and, more particularly, to a method and apparatus for generating 40+40 MHz and 40+40+40+40 MHz transmission modes for IEEE 802.11 wireless communications systems using IEEE 802.11ac waveforms with application to IEEE 802.11af wireless communication standard.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 WLAN standards body established specifications for transmissions based on the very high throughput (VHT) approach using a carrier frequency of 5 GHz (i.e., the IEEE 802.11ac specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A scheme known as "white-fi" entails expanding Wi-Fi technology with the unused frequency spectrum in the television (TV) band (i.e., the TV white space). An Institute of Electrical and Electronics Engineers (IEEE) 802.11af task group has been created to define an amendment to the IEEE 802.11 standard for using the TV white space (TVWS). The IEEE 802.11 denotes a set of WLAN air interface standards developed by the IEEE 802.11 committee for short-range communications (e.g., tens of meters to a few hundred meters). However, by using the TVWS with frequencies below 1 GHz, IEEE 802.11af may offer greater propagation distances to be achieved, in addition to the increased bandwidth offered by the unused frequencies in the TV spectrum.

SUMMARY

Certain aspects of the present disclosure provide an apparatus for wireless communications. The apparatus generally includes one or more encoders configured to encode data according to IEEE 802.11 family of wireless communication standards to obtain encoded bits, a first circuit configured to partition the encoded bits into a plurality of partitions of bits associated with a plurality of spatial streams, a second circuit configured to segment each of the partitions of bits across two or four 40 MHz segments, a transmitter configured to transmit the segmented encoded bits across the segments using a plurality of waveforms in accordance with IEEE 802.11 family of wireless communication standards, and a fourth circuit configured to select one or more inter-frame timing parameters used in transmitting down-clocked signal samples associated with the segmented encoded bits, wherein the second circuit configured to segment that partition of bits comprises a third circuit configured to assign each sequence of bits of a first size of that partition to each of the segments in round robin manner, until all the bits in that partition are assigned or a number of remaining unassigned bits is less than the first size, and the third circuit is also configured to assign each sequence of bits of a second size of the remaining unassigned bits to each of the segments in round robin manner until all the bits in that partition are assigned, if the number of remaining unassigned bits is not zero, and the second size is smaller than the first size.

Certain aspects of the present disclosure provide a method for wireless communications. The method generally includes encoding, by one or more encoders of an apparatus, data according to IEEE 802.11 family of wireless communication standards to obtain encoded bits, partitioning the encoded bits into a plurality of partitions of bits associated with a plurality of spatial streams, segmenting each of the partitions of bits across two or four 40 MHz segments, transmitting the segmented encoded bits across the segments using a plurality of waveforms in accordance with IEEE 802.11 family of wireless communication standards, and selecting one or more inter-frame timing parameters used in transmitting down-clocked signal samples associated with the segmented encoded bits.

Certain aspects of the present disclosure provide an apparatus for wireless communications. The apparatus generally includes means for encoding, by one or more encoders, data according to IEEE 802.11 family of wireless communication standards to obtain encoded bits, means for partitioning the encoded bits into a plurality of partitions of bits associated with a plurality of spatial streams, means for segmenting each of the partitions of bits across two or four 40 MHz segments, and means for transmitting the segmented encoded bits across the segments using a plurality of waveforms in accordance with IEEE 802.11 family of wireless communication standards.

Certain aspects of the present disclosure provide a computer-program product for wireless communications. The computer-program product includes a computer-readable medium comprising instructions executable to encode, by one or more encoders of an apparatus, data according to IEEE 802.11 family of wireless communication standards to obtain encoded bits, partition the encoded bits into a plurality of partitions of bits associated with a plurality of spatial streams, segment each of the partitions of bits across two or four 40 MHz segments, and transmit the segmented encoded bits across the segments using a plurality of waveforms in accordance with IEEE 802.11 family of wireless communication standards.

Certain aspects of the present disclosure provide an access point. The access point generally includes at least one antenna, one or more encoders configured to encode data according to IEEE 802.11 family of wireless communication standards to obtain encoded bits, a first circuit configured to partition the encoded bits into a plurality of partitions of bits associated with a plurality of spatial streams, a second circuit configured to segment each of the partitions of bits across two or four 40 MHz segments, and a transmitter configured to transmit the segmented encoded bits across the segments via the at least one antenna using a plurality of waveforms in accordance with IEEE 802.11 family of wireless communication standards.

Certain aspects of the present disclosure provide an apparatus for wireless communications. The apparatus generally includes a receiver configured to receive a waveform comprising a plurality of indexed spatial streams, wherein each of the streams is carried on two or four separate segments of a first size, a first circuit configured to decode and de-interleave bits of each of the plurality of spatial streams in each of the two or four separate segments of the first size in accordance with IEEE 802.11 family of wireless communications standards, and a second circuit configured to merge the bits corresponding to a same spatial stream index of the plurality of indexed spatial streams from constituent bits of the spatial stream index in the two or four separate segments of the first size, wherein the first circuit comprises a decoder and a de-interleaver operating in accordance with 40 MHz 802.11ac specification of the IEEE 802.11 family of wireless communications standards.

Certain aspects of the present disclosure provide a method for wireless communications. The method generally includes receiving a waveform comprising a plurality of indexed spatial streams, wherein each of the streams is carried on two or four separate segments of a first size, decoding and de-interleaving bits of each of the plurality of spatial streams in each of the two or four separate segments of the first size in accordance with IEEE 802.11 family of wireless communications standards, and merging the bits corresponding to a same spatial stream index of the plurality of indexed spatial streams from constituent bits of the spatial stream index in the two or four separate segments of the first size.

Certain aspects of the present disclosure provide an apparatus for wireless communications. The apparatus generally includes means for receiving a waveform comprising a plurality of indexed spatial streams, wherein each of the streams is carried on two or four separate segments of a first size, means for decoding and de-interleaving bits of each of the plurality of spatial streams in each of the two or four separate segments of the first size in accordance with IEEE 802.11 family of wireless communications standards, and means for merging the bits corresponding to a same spatial stream index of the plurality of indexed spatial streams from constituent bits of the spatial stream index in the two or four separate segments of the first size.

Certain aspects of the present disclosure provide a computer-program product for wireless communications. The computer-program product includes a computer-readable medium comprising instructions executable to receive a waveform comprising a plurality of indexed spatial streams, wherein each of the streams is carried on two or four separate segments of a first size, decode and de-interleave bits of each of the plurality of spatial streams in each of the two or four separate segments of the first size in accordance with IEEE 802.11 family of wireless communications standards, and merge the bits corresponding to a same spatial stream index of the plurality of indexed spatial streams from constituent bits of the spatial stream index in the two or four separate segments of the first size.

Certain aspects of the present disclosure provide an access terminal. The access terminal generally includes at least one antenna, a receiver configured to receive, via the at least one antenna, a waveform comprising a plurality of indexed spatial streams, wherein each of the streams is carried on two or four separate segments of a first size, a first circuit configured to decode and de-interleave bits of each of the plurality of spatial streams in each of the two or four separate segments of the first size in accordance with IEEE 802.11 family of wireless communications standards, and a second circuit configured to merge the bits corresponding to a same spatial stream index of the plurality of indexed spatial streams from constituent bits of the spatial stream index in the two or four separate segments of the first size.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates an example VHT-SIG-A (Very High Throughput Signal field type A) bandwidth indication in accordance with certain aspects of the present disclosure.

FIG. 10 illustrates examples of inter-frame spaces in accordance with certain aspects of the present disclosure.

DETAILED DESCRIPTION

Figure 1:
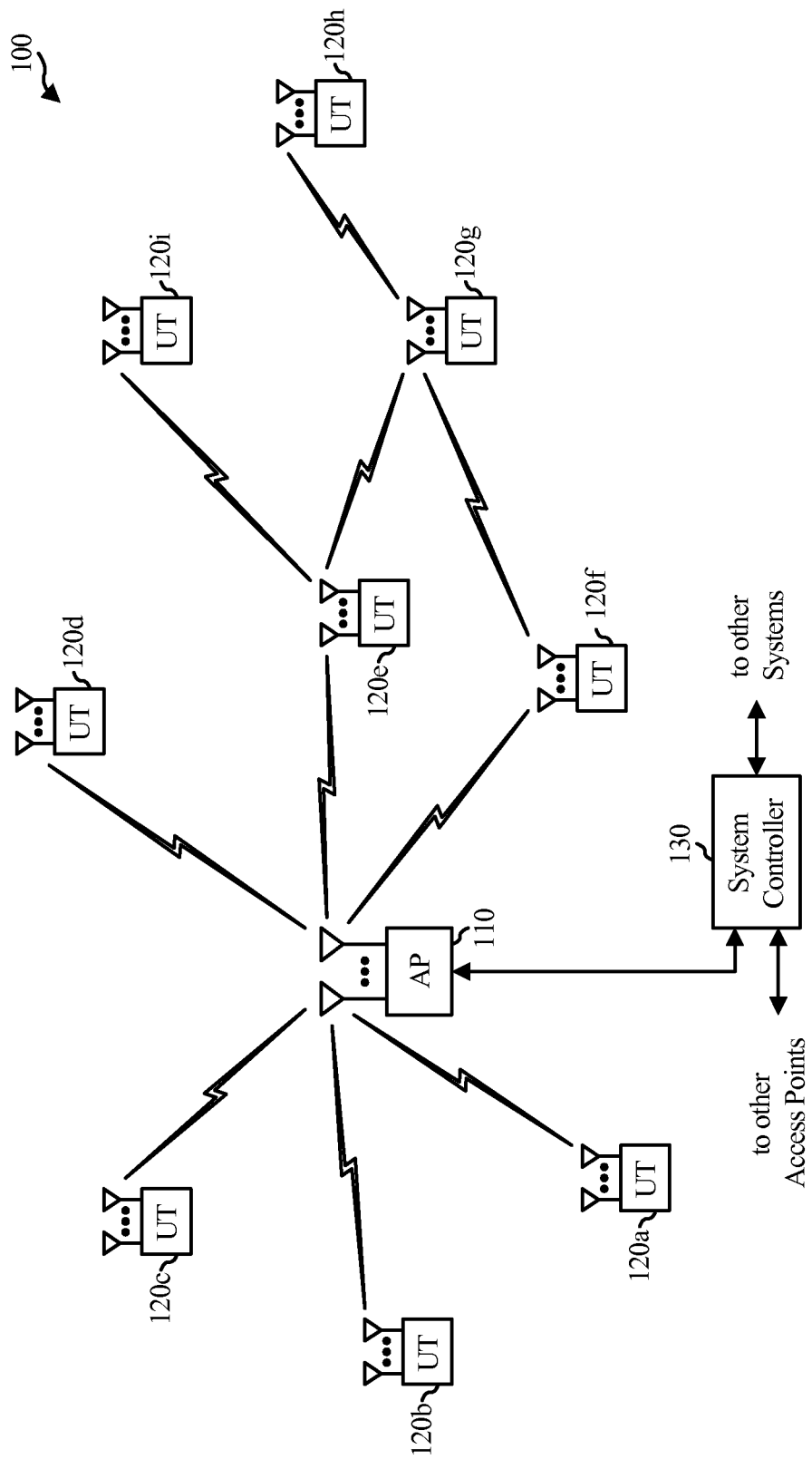
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

AN EXAMPLE WIRELESS COMMUNICATION SYSTEM

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are created in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
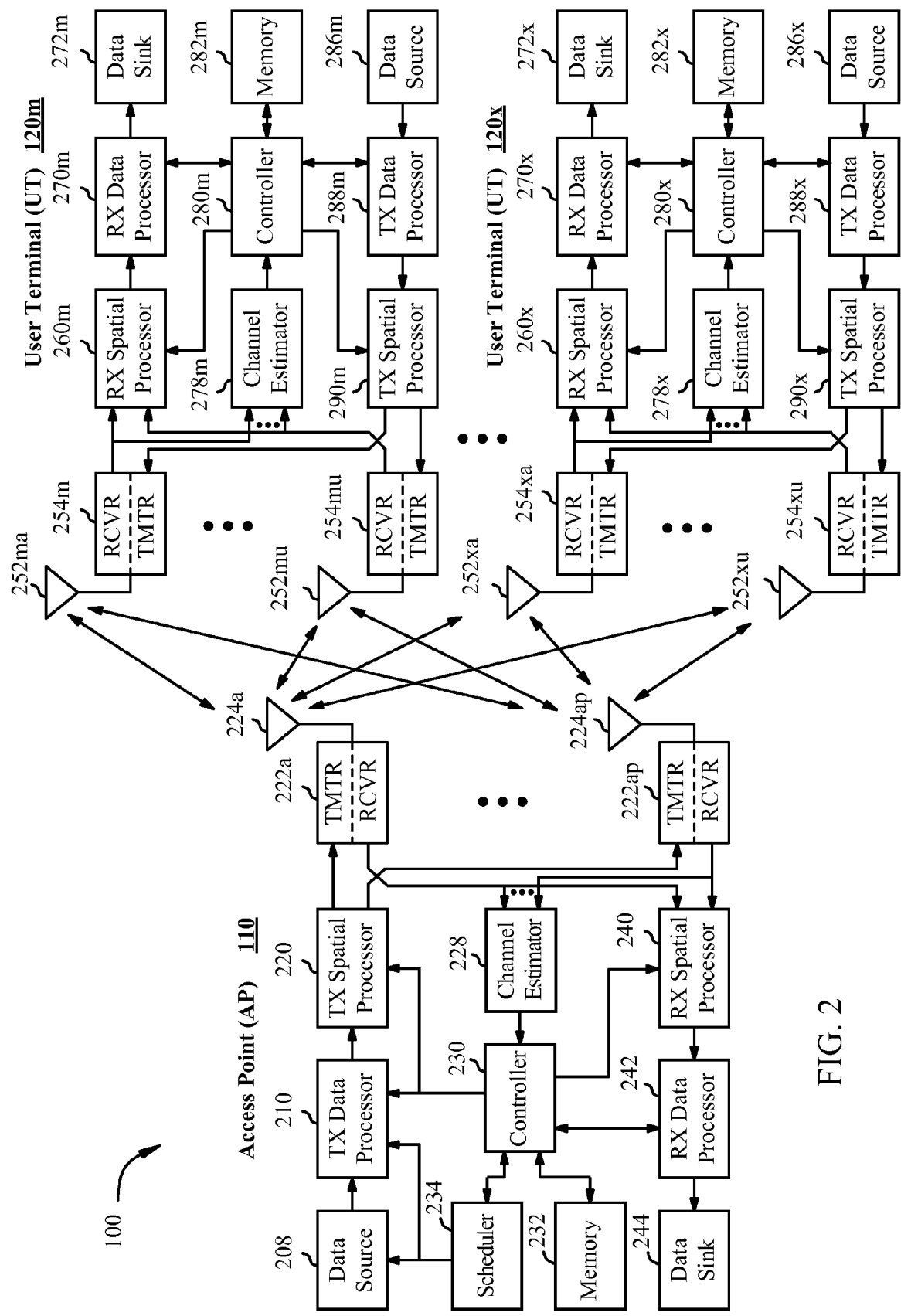
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In accordance with certain aspects of the present disclosure, the wireless system 100 illustrated in FIG. 1 may operate in accordance with IEEE 802.11ac wireless communications standard. The IEEE 802.11ac represents a new IEEE 802.11 amendment that allows for higher throughput in IEEE 802.11 wireless networks. The higher throughput may be realized through several measures such as parallel transmissions to multiple user stations (STAs) at once, or by using a wider channel bandwidth (e.g., 80 MHz or 160 MHz). The IEEE 802.11ac is also referred to as Very High Throughput (VHT) wireless communications standard.

Figure 3:
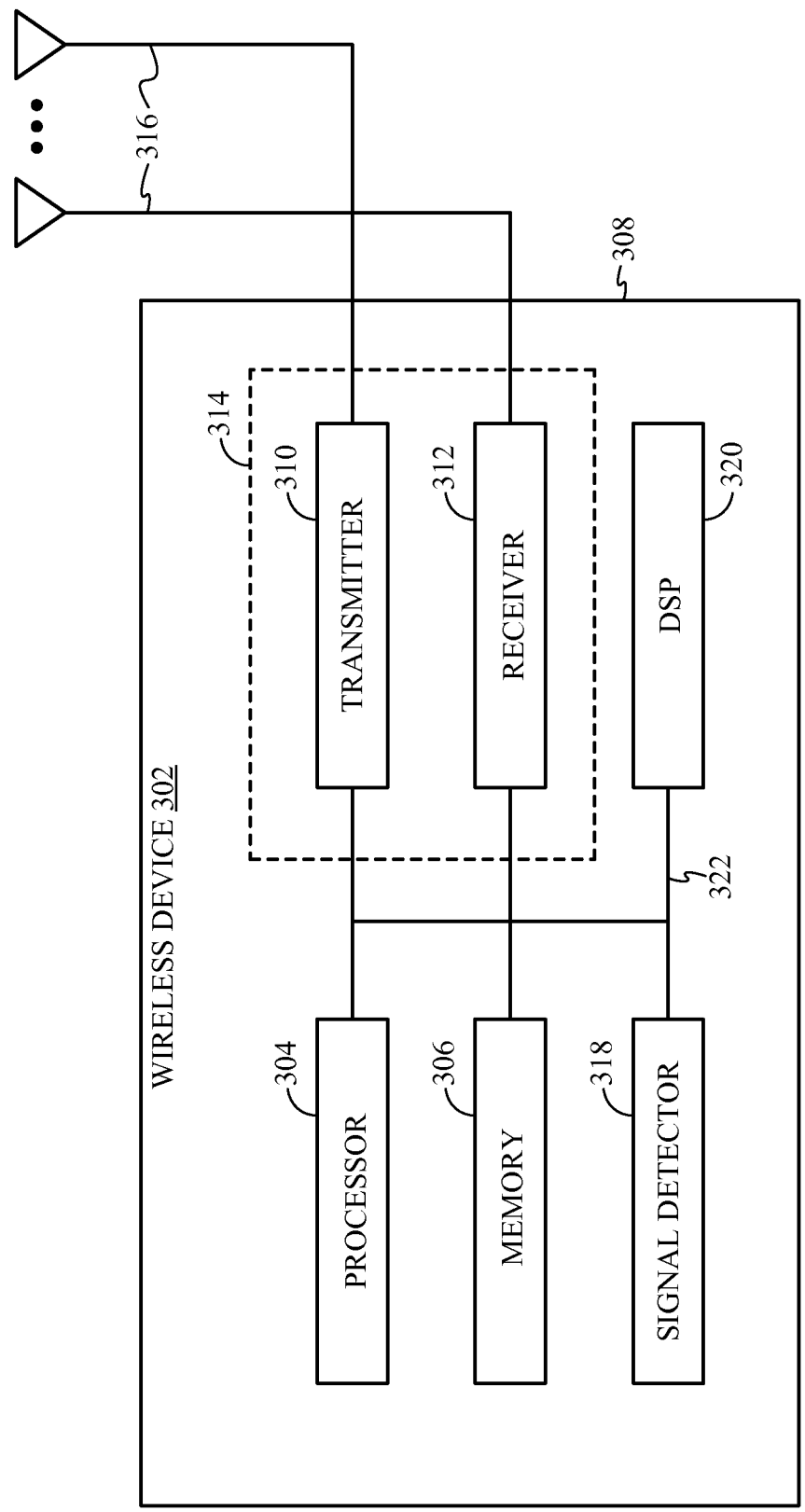
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may, for example, correspond to the access point 110 or to the user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and another wireless node (e.g., another wireless node in a remote location). The transmitter 310 and receiver 312 may be combined into a transceiver 314. Wireless device 302 may also include one or more antennas 316 electrically coupled to the transceiver 314. The wireless device 302 may also include (not shown) multiple transmitters, multiple receivers, multiple transceivers, and/or multiple antennas.

The wireless device 302 may also include a signal detector 318 that may detect and quantify the level of signals received by the transceiver 314. The signal detector 318 may quantify detection of such signals using total energy, energy per sub-carrier per symbol, power spectral density and/or other quantification metrics. The wireless device 302 may also include a digital signal processor (DSP) 320 for use in processing signals.

The various components of the wireless device 302 may be coupled by a bus system 322, which may include a power bus, a control signal bus, and a status signal bus in addition to a data bus.

Certain aspects of the present disclosure support a method and apparatus for generating 40+40 MHz and 40+40+40+40 MHz transmission modes, which may be included into a physical layer (PHY) specification of IEEE 802.11ac wireless communications standard. In an aspect of the present disclosure, by using separate radio frequency (RF) chains, 80 MHz and 160 MHz operation for 802.11ac can be realized by having two or four separate carriers which may or may not be adjacent to each other. The present disclosure further provides a PHY layer that can be down-clocked by a pre-defined factor to realize multicarrier PHY for use in Television White Space (TVWS, or IEEE 802.11af).

Design of 40+40 MHz and 40+40+40+40 MHz Transmission Modes for IEEE 802.11ac

Motivation for designing 40+40 MHz transmission mode for IEEE 802.11ac is to generate 5 MHz mode in IEEE 802.11af by down-clocking 802.11ac 40+40 MHz transmission by the factor of eight. In an aspect, 10 MHz mode in IEEE 802.11af may need to be achieved by multicarrier approach in order to allow for 5 MHz/10 MHz coexistence. The reason for this is that channelization in TVWS is in steps greater than 5 MHz. Therefore, 40+40 MHz transmission mode with non-adjacent bands in 802.11ac may be needed that can be clocked down to 5+5 MHz mode for 802.11af. In case when four TVWS 5 MHz channels can be available, 40+40+40+40 MHz transmission mode with non-adjacent bands in 802.11ac may be down-clocked to obtain 5+5+5+5 MHz mode for 802.11af.

A bandwidth of Physical layer convergence procedure (PLCP) Protocol Data Unit (PPDU) can be indicated in a VHT-SIGA field (Very High Throughput Signal field type A) for 802.11ac PPDUs. FIG. 4 illustrates an example VHT-SIGA bandwidth indication in accordance with certain aspects of the present disclosure. As illustrated in Table 400 in FIG. 4, currently utilized VHT-SIGA bandwidth bits are B0 and B1 bits, while B2 bit is reserved for possible expansion of Bandwidth field and it is set to '1'.

In an aspect of the present disclosure, one or more bits (e.g., the B2 bit) of the VHT-SIGA field may be used to indicate 40+40 MHz and 40+40+40+40 MHz transmission mode. Table 402 in FIG. 4 illustrates new signal field bandwidth indications. It should be noted that all modulation-coding schemes (MCSs) may be available. Further, up to six encoders may be required for higher number of spatial streams (SS).

Figure 5:
FIG. 5 illustrates example features of 40+40 MHz and 40+40+40+40 MHz transmission modes in accordance with certain aspects of the present disclosure.

FIG. 5 illustrates example features 500 of 40+40 MHz and 40+40+40+40 MHz transmission modes in accordance with certain aspects of the present disclosure. It should be noted different features between 40+40 MHz mode and the contiguous 80 MHz mode, as well as different features between 40+40+40+40 MHz mode and the contiguous 160 MHz mode.

Figure 6:
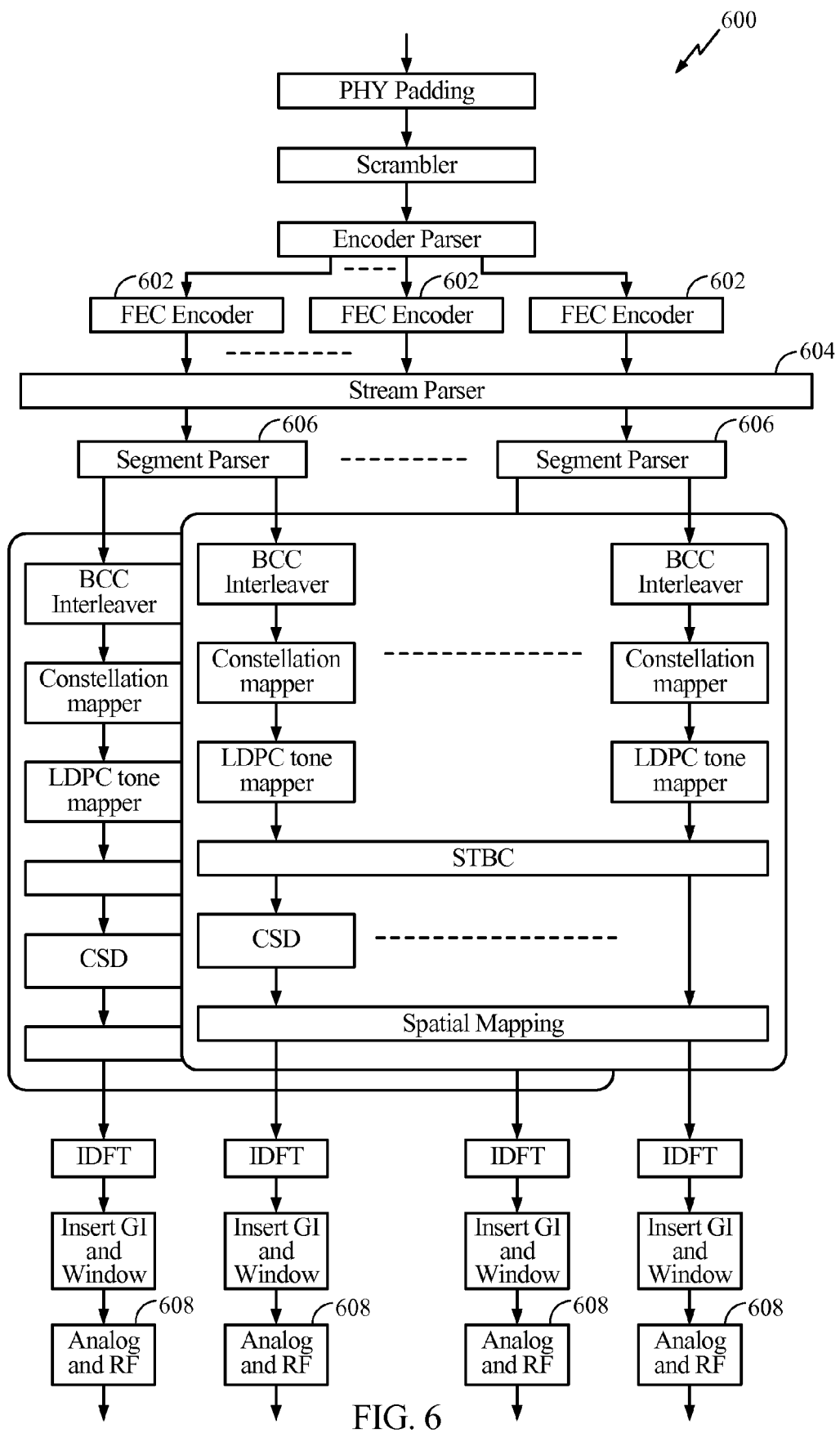
FIG. 6 illustrates an example block diagram of a transmitter for 40+40 MHz transmission mode in accordance with certain aspects of the present disclosure.

FIG. 6 illustrates an example block diagram 600 of a transmitter for 40+40 MHz transmission mode for 802.11ac in accordance with certain aspects of the present disclosure. It should be noted that the transmitter block diagram 600 may be identical to the diagram for non-contiguous 80+80 MHz mode, wherein the only difference may be in the size of Inverse Discrete Fourier Transform (IDFT) blocks (i.e., IDFT size of 128 corresponding to a number of subcarriers in a segment of 40 MHz instead of 256-IDFT corresponding to subcarriers of a segment comprising 80 MHz). It can be observed from FIG. 6 that two RF processing chains may be required for the 40+40 MHz 802.11ac transmitter.

PHY Specification for 40+40 MHz Mode

In an aspect of the present disclosure, in case of non-contiguous 40+40 MHz VHT PPDU transmission, each 40 MHz frequency segment may be divided into 128 subcarriers. In each frequency segment, a signal may be transmitted on subcarriers −58 to −2 and 2 to 58.

Regarding a Legacy Short Training Field (L-STF) of a preamble, for non-contiguous transmissions using two 40 MHz frequency segments, each 40 MHz frequency segment may utilize the L-STF pattern for the 40 MHz ($S_{-58,58}$) defined as for 802.11n 40 MHz STF. Regarding a Legacy Long Training Field (L-LTF) of the preamble, for non-contiguous transmissions using two 40 MHz frequency segments, each 40 MHz frequency segment may utilize the L-LTF pattern for the 40 MHz ($L_{-58,58}$) defined as for 802.11n 40 MHz LTF.

Regarding a Very High Throughput Signal field type A (VHT-SIGA) of the preamble, for non-contiguous transmissions using two 40 MHz frequency segments, each frequency segment may utilize the time domain waveform for 40 MHz transmissions. For non-contiguous transmissions using two 40 MHz frequency segments, each 40 MHz frequency segment may use the VHT-STF pattern for the 40 MHz 802.11n (VHTS$_{-58,58}$). In an aspect, regarding a Very High Throughput Signal field type B (VHT-SIGB) of the preamble, 40+40 MHz mode may have 21 VHT-SIGB bits.

For Binary Convolutional Code (BCC) interleavers of the transmitter 600 from FIG. 6, in case of contiguous 160 MHz or non-contiguous 80+80 MHz VHT PPDU or non-contiguous 40+40 MHz VHT PPDU transmissions, each sub-block of $N_{CBPSS}/2$ output bits from a segment parser may be interleaved by the interleaver for 40 MHz (for 40+40 MHz) or 80 MHz (for 160 or 80+80 MHz), wherein $N_{CBPSS}$ represents a number of coded bits per spatial stream.

Regarding pilot subcarriers, for a non-contiguous transmission using two 40 MHz frequency segments, each frequency segment may follow the 40 MHz pilot tone allocation and values defined for 40 MHz 802.11n transmission. For non-contiguous 40+40 MHz non-HT (HT: High Throughput) duplicate, data transmission in each frequency segment may be as defined for 40 MHz 802.11n non-HT duplicate transmission.

PHY Specification for 40+40+40+40 MHz Mode

Figure 7:
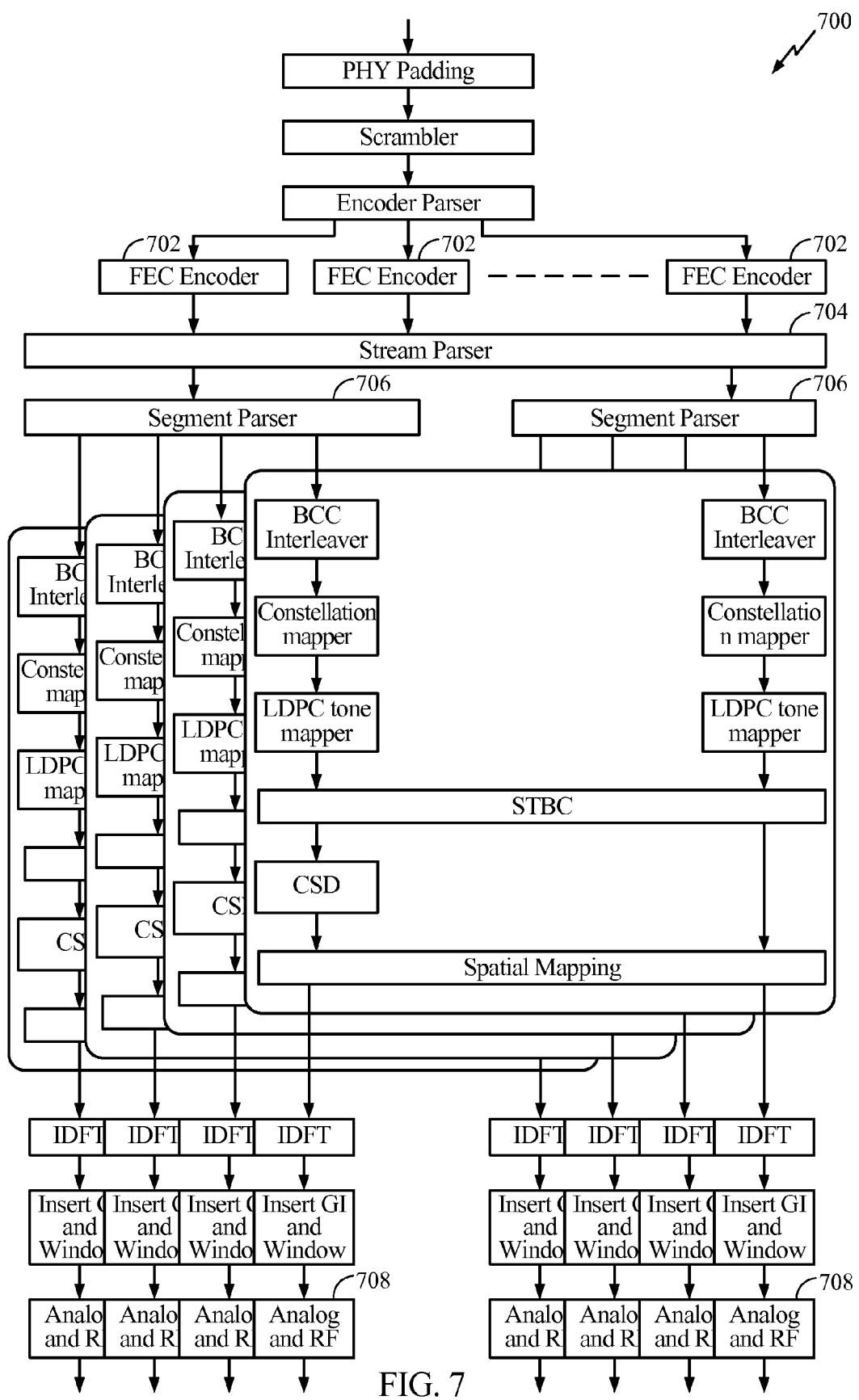
FIG. 7 illustrates an example block diagram of a transmitter for 40+40+40+40 MHz transmission mode in accordance with certain aspects of the present disclosure.

FIG. 7 illustrates an example block diagram 700 of a transmitter for 40+40+40+40 MHz transmission mode in accordance with certain aspects of the present disclosure. In an aspect, a segment parser of the transmitter 700 may be configured to split transmission data across four 40 MHz segments. More details about the segment parser will follow in the present disclosure. It should be noted that four RF processing chains may be required in the transmitter 700.

In an aspect of the present disclosure, in case of non-contiguous 40+40+40+40 MHz VHT PPDU transmission, each 40 MHz frequency segment may be divided into 128 subcarriers. In each frequency segment, a signal may be transmitted on subcarriers −58 to −2 and 2 to 58.

Regarding an L-STF of a preamble, for non-contiguous transmissions using four 40 MHz frequency segments, each 40 MHz frequency segment may utilize the L-STF pattern for the 40 MHz ($S_{-58,58}$) defined as for 802.11n 40 MHz STF. Regarding an L-LTF of the preamble, for non-contiguous transmissions using four 40 MHz frequency segments, each 40 MHz frequency segment may utilize the L-LTF pattern for the 40 MHz ($L_{-58,58}$) defined as for 802.11n 40 MHz LTF.

Regarding a VHT-SIGA field of the preamble, for non-contiguous transmissions using four 40 MHz frequency segments, each frequency segment may utilize the time domain waveform for 40 MHz transmissions. For non-contiguous transmissions using four 40 MHz frequency segments, each 40 MHz frequency segment may use the VHT-STF pattern for the 40 MHz 802.11n (VHTS$_{-58,58}$). In an aspect, regarding a VHT-SIGB field of the preamble, 40+40+40+40 MHz mode may have 21 VHT-SIGB bits.

In an aspect, for a stream parser of the transmitter 700 from FIG. 7, for 160 MHz MCSs and 40+40+40+40 MHz, if each BCC encoder does not generate integer blocks of S coded bits in each OFDM symbol, then the stream parsing method may be applied until the last integer block (i.e., floor($N_{CBPS}/N_{ES}/S$)) of S bits at each encoder of $N_{ES}$ encoders.

In an aspect, for a BCC interleaver of the transmitter 700, in case of contiguous 160 MHz or non-contiguous 80+80 MHz VHT PPDU or non-contiguous 40+40+40+40 MHz VHT PPDU transmissions, each sub-block of $N_{CBPSS}/4$ output bits from the segment parser may be interleaved by the interleaver for 40 MHz.

Regarding pilot subcarriers, for a non-contiguous transmission using four 40 MHz frequency segments, each frequency segment may follow the 40 MHz pilot tone allocation and values defined for 40 MHz 802.11n 40 transmission. For non-contiguous 40+40 MHz non-HT duplicate, data transmission in each frequency segment may be as defined for 40 MHz 802.11n non-HT duplicate transmission.

Segment Parser

For the 40+40 MHz mode, the operation of the segment parser can be identical to the operation of the segment parser for non-contiguous 80 MHz mode. On the other hand, for the 40+40+40+40 MHz mode, the encoded bits may be parsed into four segments using a segment parser designed for four streams.

Notation required to describe the operation of the segment parser for four frequency segments: $N_{CBPSS}$ is a number of coded bits per spatial stream, $N_{ES}$ is a number of encoders ($N_{ES}$ is greater than one for data rates greater than 600 Mb/s for BCC based encoding, $N_{ES}=1$ for Low Density Parity Check (LDPC) based encoding), $N_{BPSCS}$ is a number of bits per sub carrier per stream, and $s=\max(1, N_{BPSCS}/2)$.

In an aspect, each block of $N_{CBPSS}$ bits may be divided into four sub-blocks of $N_{CBPSS}/4$ bits associated with four 40 MHz segments as follows. Each sequence of $4sN_{ES}$ bits may be assigned to each sub-block in a round robin fashion until all the $N_{CBPSS}$ bits are exhausted or the number of remaining bits is less than $4sN_{ES}$. If there is a block of remaining bits, then each sequence of s bits may be assigned to each sub block in a round robin manner until all the bits are exhausted. It should be noted that the number of remaining bits is always divisible by 4s.

The segment parser may define the k-th bit of a sub-block l as follows:

$$y_{k,l} = x_{4 \cdot s \cdot N_{ES} \lfloor \frac{k}{s \cdot N_{ES}} \rfloor + l \cdot s \cdot N_{ES} + k \, mod(s \cdot N_{ES})}, \quad (1)$$

$$k = 0, 1, \ldots, N_{CBPSS}/N_{seg},$$

where $\lfloor z \rfloor$ is the largest integer less than or equal to z, z mod t is the remainder resulting from the division of integer z by integer t, $x_m$ is the m-th bit of a block of $N_{CBPSS}$ bits, m=0 to $N_{CBPSS}-1$, l is the sub-block index, l=0,1, ..., $N_{seg}$, $y_{k,l}$ is the k-th bit of the sub-block l, $s=\max(1, N_{CBPSCS}/2)$, and $N_{ES}$ is a number of encoders used.

If $N_{CBPSS}$ is not divisible by $4 \cdot s \cdot N_{ES}$, then the segment parsing method may be applied in $\lfloor N_{CBPSS}/(4 \cdot s \cdot N_{ES}) \rfloor$ blocks of $4 \cdot s \cdot N_{ES}$ segment parser input bits. At this point, each stream parser output may have $4 \cdot s \cdot R$ ($R < N_{ES}$, integer) residue bits. Then, the residue bits may be divided into blocks of s bits, with each block being assigned to different sub-block (l=0, 1, ..., $N_{seg}$) in a round robin fashion. In an aspect, the first s bits may be assigned to the sub-block with index l=0. This may be repeated R times until all bits are distributed to the four sub-blocks.

Figure 8:
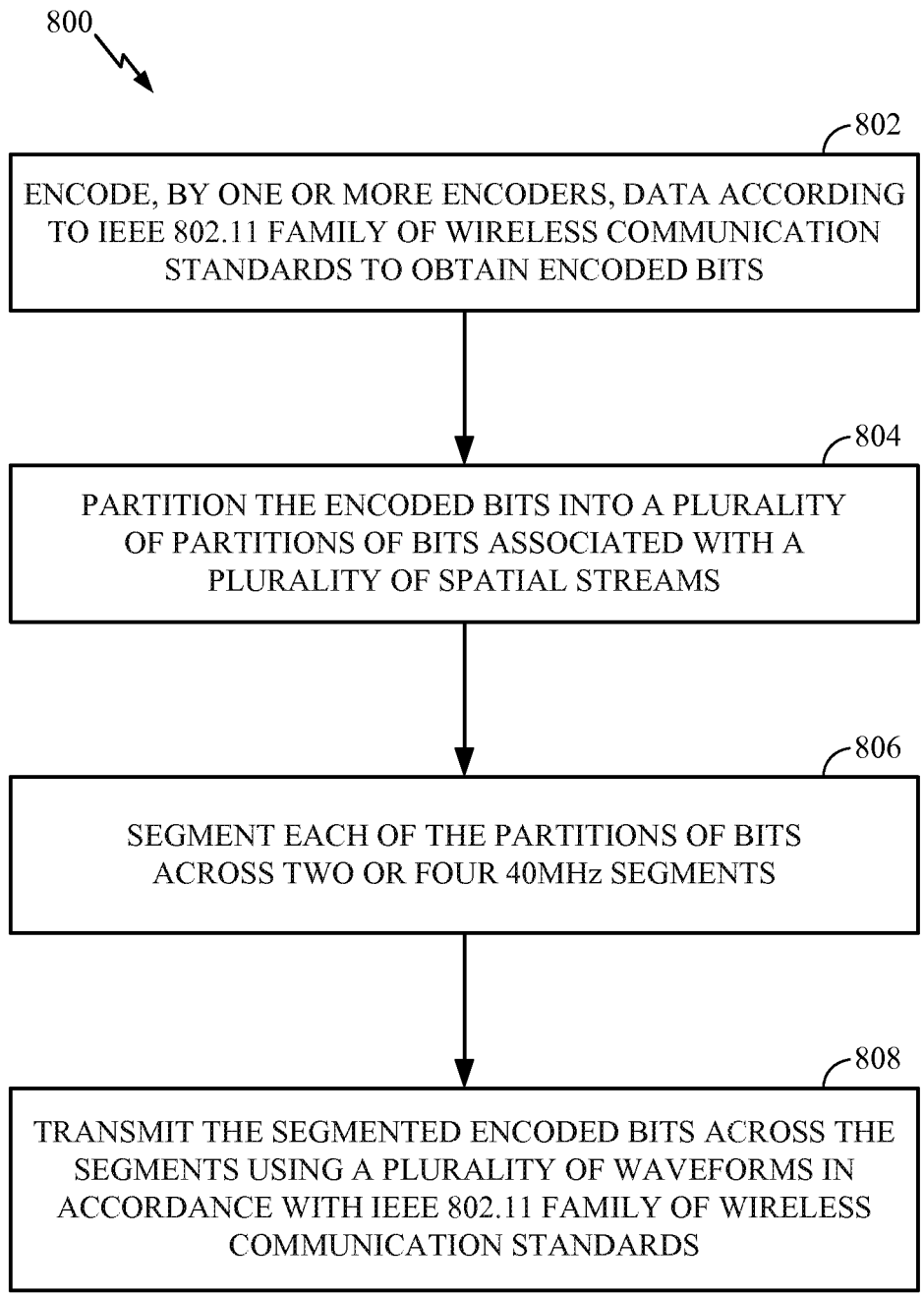
FIG. 8 illustrates example operations that may be performed at a transmitting device in accordance with certain aspects of the present disclosure.

FIG. 8 illustrates example operations 800 that may be performed at a transmitting device (e.g., at the transmitting device 600 from FIG. 6 and/or at the transmitting device 700 from FIG. 7) configured for encoding data and data segmentation in accordance with certain aspects of the present disclosure. At 802, data may be encoded by one or more encoders of the transmitting device (e.g., by one or more Forward Error Correction (FEC) encoders 602 from FIG. 6 and/or by one or more FEC encoders 702 from FIG. 7) according to IEEE 802.11 family of wireless communication standards to obtain encoded bits. At 804, the encoded bits may be partitioned (e.g., by a stream parser 604 from FIG. 6 and/or by a stream parser 704 from FIG. 7) into a plurality of partitions of bits associated with a plurality of spatial streams. At 806, each of the partitions of bits may be segmented (e.g., by one of segment parsers 606 from FIG. 6 and/or by one of segment parsers 706 from FIG. 7) across two or four 40 MHz segments. At 808, the segmented encoded bits may be transmitted (e.g., by RF transmission circuitry 608 from FIG. 6 and/or by RF transmission circuitry 708 from FIG. 7) across the segments using a plurality of waveforms in accordance with IEEE 802.11 family of wireless communication standards.

In an aspect, the plurality of waveforms may comprise 802.11ac based waveforms. In another aspect, the plurality of waveforms may comprise 802.11af (TVWS) based waveforms.

In an aspect, each of the segments may be carried in a 40 MHz 802.11ac waveform of the plurality of waveforms. In the exemplary case of the present disclosure, the data may be populated on 108 of 128 subcarriers in each of the 40 MHz segments.

In an aspect, segmenting that partition of bits belonging to a spatial stream of the plurality of spatial streams across the two or four segments may comprise assigning each of the bits of the spatial stream to each of the segments in a round robin fashion.

In an aspect, an interleaver of the transmitting device may be configured to interleave the bits of a segment of the two or more segments across 108 subcarriers of a 40 MHz 802.11ac waveform of the plurality of waveforms, wherein the interleaver may comprise a 40 MHz 802.11ac interleaver, and the one or more encoders may comprise one or more Binary Convolutional Code (BCC) encoders. In an aspect, the transmitting device may comprise four distinct processing chains, wherein each of the processing chains may be assigned to one of the 40 MHz segments, and each of the processing chains may be identical to a transmit chain associated with 40 MHz 802.11ac transmission.

Figure 8A:
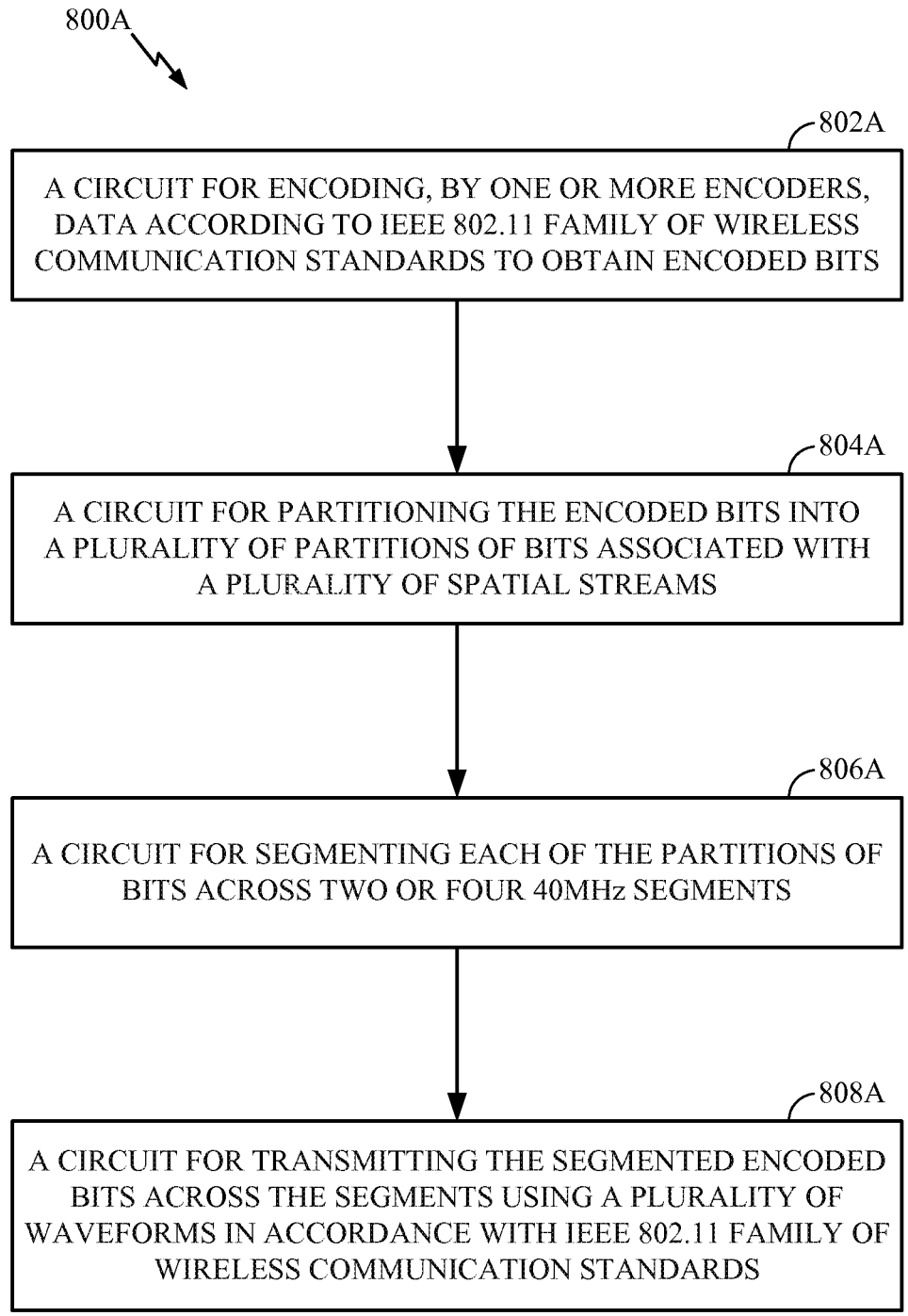
FIG. 8A illustrates example components capable of performing the operations shown in FIG. 8.

FIG. 8A illustrates example operations 800A that may be performed at a transmitting apparatus (e.g., at the access point 110 from FIG. 2, at the wireless device 302 from FIG. 3, at the transmitting device 600 from FIG. 6, and/or at the transmitting device 700 from FIG. 7) in accordance with certain aspects of the present disclosure. At 802A, one or more encoders of the apparatus (e.g., the TX data processor 210, the processor 304, the one or more FEC encoders 602, and/or the one or more FEC encoders 702) may be configured to encode data according to IEEE 802.11 family of wireless communication standards to obtain encoded bits. At 804A, a first circuit (module) of the apparatus (e.g., the TX spatial processor 220, the processor 304, the stream parser 604, and/or the stream parser 704) may be configured to partition the encoded bits into a plurality of partitions of bits associated with a plurality of spatial streams. At 806A, a second circuit (module) of the apparatus (e.g., the TX spatial processor 220, the processor 304, any of the segment parsers 606, and/or any of the segment parsers 706) may be configured to segment each of the partitions of bits across two or four 40 MHz segments. At 808A, a transmitter of the apparatus (e.g., the transmitter 222, the transmitter 310, the transmitter 608, and/or the transmitter 708) may be configured to transmit the segmented encoded bits across the segments using a plurality of waveforms in accordance with IEEE 802.11 family of wireless communication standards.

In an aspect of the present disclosure, a third circuit (module) of the apparatus (e.g., the TX spatial processor 220, the processor 304, any of the segment parsers 606, and/or any of the segment parsers 706) may be configured to assign each of the bits of the spatial stream to each of the segments in a round robin manner. Further, a fourth circuit (module) of the apparatus (e.g., the transmitter unit 222, the transmitter unit 310, the transmission circuitry 608, and/or the transmission circuitry 708) may be configured to select one or more interframe timing parameters to be used in transmitting signal samples associated with the segmented encoded bits, wherein the signal samples may be down-clocked before the transmission.

Figure 9:
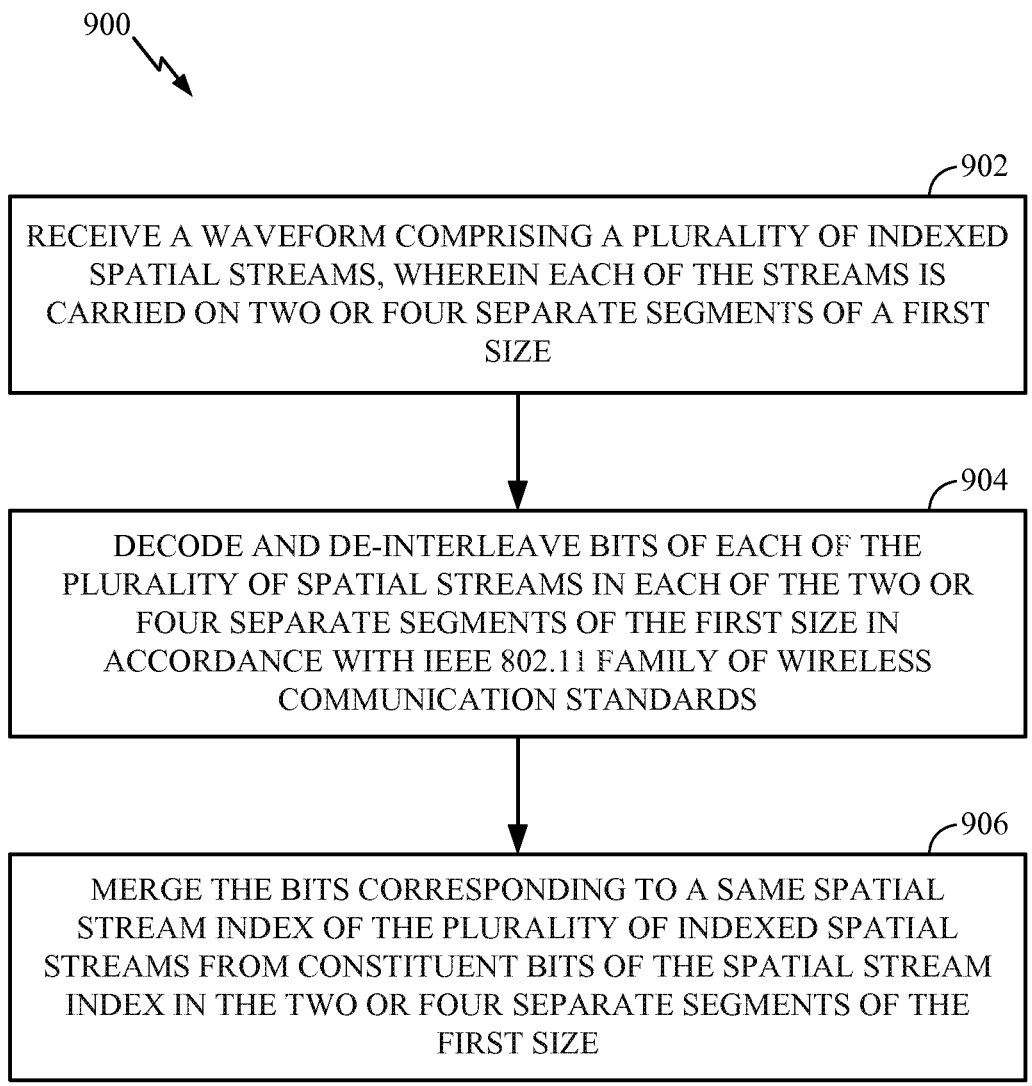
FIG. 9 illustrates example operations that may be performed at a receiving device in accordance with certain aspects of the present disclosure.

FIG. 9 illustrates example operations 900 that may be performed at a receiving device communicating with the transmitting device 600 and/or the transmitting device 700 in accordance with certain aspects of the present disclosure. At 902, the receiving device may receive a waveform comprising a plurality of indexed spatial streams, wherein each of the streams may be carried on two or four separate segments of a first size. At 904, the receiving device may decode and de-interleave bits of each of the plurality of spatial streams in each of the two or four separate segments of the first size in accordance with IEEE 802.11 family of wireless communications standards. At 906, the receiving device may merge the bits corresponding to a same spatial stream index of the plurality of indexed spatial streams from constituent bits of the spatial stream index in the two or four separate segments of the first size. After that, the receiving device may merge the bits of separate spatial streams of the plurality of spatial streams to obtain a received data bit stream.

In an aspect, the decoding and de-interleaving may operate in accordance with 40 MHz 802.11ac specification of the IEEE 802.11 family of wireless communications standards. In one aspect of the present disclosure, the received waveform may comprise an 802.11ac based waveform, and the first size may comprise 40 MHz bandwidth. In another aspect, the received waveform may comprise an 802.11af (TVWS) based waveform, and the first size may comprise 5 MHz bandwidth, 6 MHz bandwidth, 7 MHz bandwidth, or 8 MHz bandwidth.

Figure 9A:
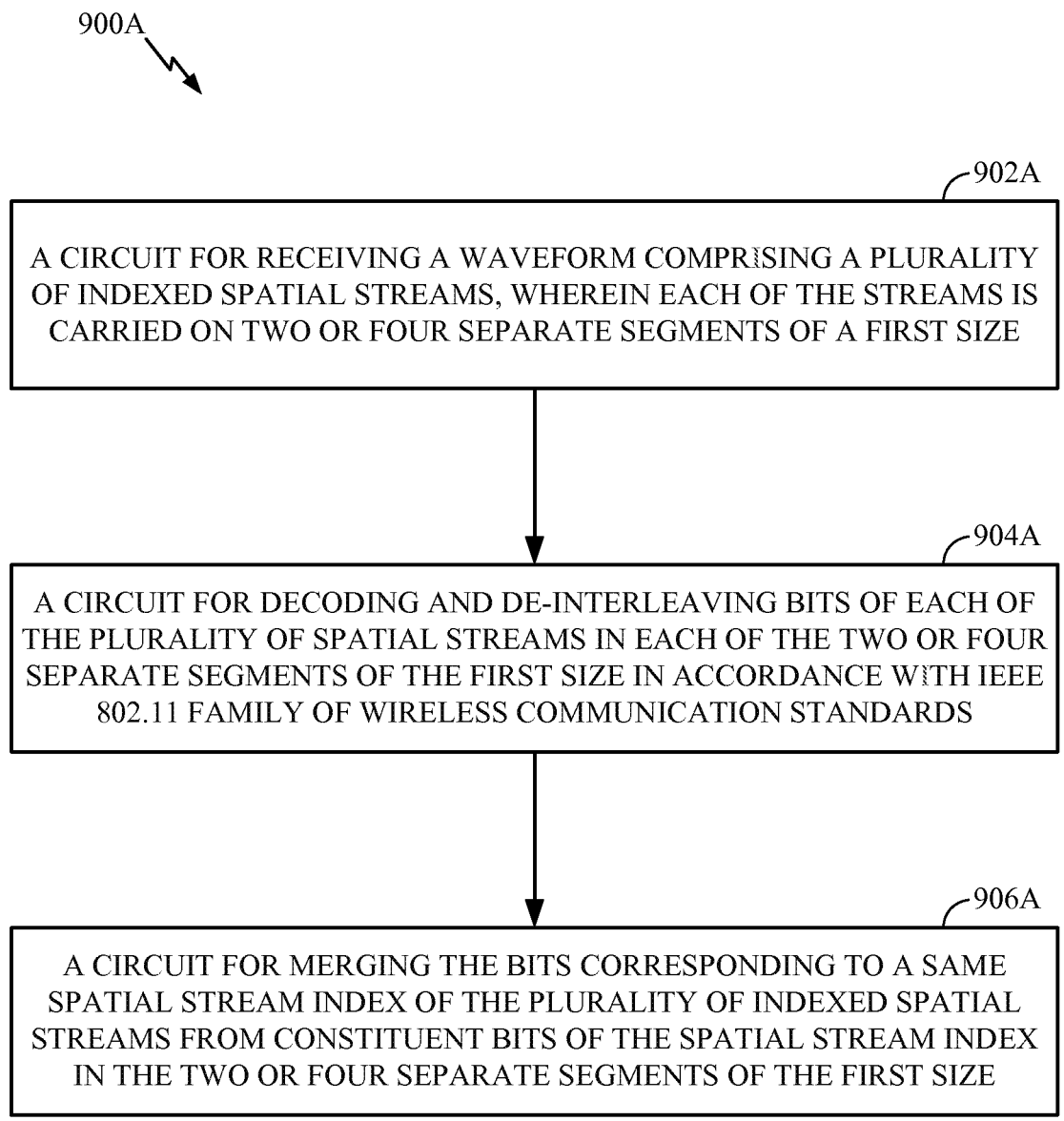
FIG. 9A illustrates example components capable of performing the operations shown in FIG. 9.

FIG. 9A illustrates example operations 900A that may be performed at a receiving apparatus (e.g., at any of the user terminals 120 from FIG. 2, and/or at the wireless device 302 from FIG. 3) in accordance with certain aspects of the present disclosure. At 902A, a receiver of the apparatus (e.g., the receiver 254 and/or the receiver 312) may be configured to receive a waveform comprising a plurality of indexed spatial streams, wherein each of the streams is carried on two or four separate segments of a first size. At 904A, a first circuit (module) of the apparatus (e.g., the RX data processor 270 and/or the processor 304) may be configured to decode and de-interleave bits of each of the plurality of spatial streams in each of the two or four separate segments of the first size in accordance with IEEE 802.11 family of wireless communications standards. At 906A, a second circuit (module) of the apparatus (e.g., the RX data processor 270 and/or the processor 304) may be configured to merge the bits corresponding to a same spatial stream index of the plurality of indexed spatial streams from constituent bits of the spatial stream index in the two or four separate segments of the first size.

Application to Television White Space

In an aspect of the present disclosure, the 40+40 MHz transmission mode designed above can be used to carry data over two separate 5 MHz carriers in IEEE 802.11af (Television White Space) by down-clocking signal samples associated with the segmented encoded bits before the transmission using a down-clock factor of eight. Further, the 40+40+40+40 MHz transmission mode designed above can be used to carry data over four separate 5 MHz carriers in IEEE 802.11af (Television White Space) by down-clocking signal samples associated with the segmented encoded bits using a down-clock factor of eight. Moreover, the down-clock factor of 40/6, 40/7 or 5 may be applied for carrying data samples over two or four separate 6 MHz carriers, two or four separate 7 MHz carriers, or two or four separate 8 MHz carriers, respectively.

Certain aspects of the present disclosure support a Media Access Control (MAC) layer with timing parameters of inter-frame spaces as provided in FIG. 10 for 5 MHz, 6 MHz, 7 MHz, and 8 MHz operations. For example, 'aCCATime' timing parameter (CCA: Clear Channel Assessment) may correspond to one symbol time, and the value of 'aCCATime' (CCA-Time) may be 32 μs (for 6 MHz TV BW, 5 MHz baseband), 27 μs (for 6 or 7 MHz TV BW, 6 MHz baseband), 23 μs (for 7 or 8 MHz TV BW, 7 MHz baseband), or 20 μs (for 8 MHz TV BW, 8 MHz baseband). The timing parameter 'aRxTxTurnaroundTime' may be based on radio frequency (RF) circuits of a transmitter, and the value of 'aRxTxTurnaroundTime' (RxTx-Turnaround-Time) may be 2 μs for 5 MHz, 6 MHz, 7 MHz, and 8 MHz operations, as given in FIG. 10. The timing parameter 'aAirPropagationTime' may correspond to RF propagation time, and the value of 'aAirPropagationTime' (Air-Propagation-Time) may be 1 μs for 5 MHz, 6 MHz, 7 MHz, and 8 MHz operations, as given in FIG. 10.

Further, the timing parameter 'aMACProcessingDelay' may correspond to a MAC processing time, and the value of 'aMACProcessingDelay' (MAC-Processing-Delay) may be 2 μs for 5 MHz, 6 MHz, 7 MHz, and 8 MHz operations, as given in FIG. 10. The timing parameter 'aSlotTime' may be based on 'aCCATime', 'aRxTxTurnaroundTime', 'aAirPropagationTime', and 'aMACProcessingDelay', as given in FIG. 10. The value of 'aSlotTime' (Slot-Time) may be 37 μs (for 6 MHz TV BW, 5 MHz baseband), 32 μs (for 6 or 7 MHz TV BW, 6 MHz baseband), 28 μs (for 7 or 8 MHz TV BW, 7 MHz baseband), or 25 μs (for 8 MHz TV BW, 8 MHz baseband). The SIFS (Short Inter-Frame Space) timing parameter may correspond to one slot time, and the value of SIFS may be 37 μs (for 6 MHz TV BW, 5 MHz baseband), 32 μs (for 6 or 7 MHz TV BW, 6 MHz baseband), 28 μs (for 7 or 8 MHz TV BW, 7 MHz baseband), or 25 μs (for 8 MHz TV BW, 8 MHz baseband). The DIFS (Distributed Inter-Frame Space) timing parameter may be based on the SIFS time and 'aSlotTime', as given in FIG. 10. According to certain aspects, the DIFS time may be equal to 111 μs (for 6 MHz TV BW, 5 MHz baseband), 96 μs (for 6 or 7 MHz TV BW, 6 MHz baseband), 84 μs (for 7 or 8 MHz TV BW, 7 MHz baseband), or 75 μs (for 8 MHz TV BW, 8 MHz baseband).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, operations 800 and 900 illustrated in FIGS. 8 and 9 correspond to components 800A and 900A illustrated in FIGS. 8A and 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for encoding data may comprise an application specific integrated circuit, e.g., the TX data processor 210 from FIG. 2, the processor 304 from FIG. 3, the FEC encoders 602 from FIG. 6, or the FEC encoders 702 from FIG. 7. The means for partitioning may comprise an application specific integrated circuit, e.g., the TX spatial processor 220 from FIG. 2, the processor 304, the stream parser 604 from FIG. 6, or the stream parser 704 from FIG. 7. The means for segmenting may comprise an application specific integrated circuit, e.g., the TX spatial processor 220, the processor 304, any of the segment parsers 606 from FIG. 6, or any of the segment parsers 706 from FIG. 7. The means for transmitting may comprise a transmitter, e.g., the transmitter 222 from FIG. 2, the transmitter 310 from FIG. 3, the transmitter 608 from FIG. 6, or the transmitter 708 from FIG. 7. The means for assigning may comprise an application specific integrated circuit, e.g., the TX data processor 210 or the processor 304. The means for interleaving may comprise an application specific integrated circuit, e.g., the TX data processor 210 or the processor 304. The means for down-clocking signal samples associated with the segmented encoded bits may comprise an application specific integrated circuit, e.g., the TX data processor 210 or the processor 304. The means for selecting may comprise an application specific integrated circuit, e.g., the TX data processor 210 or the processor 304. The means for indicating may comprise an application specific integrated circuit, e.g., the TX data processor 210 or the processor 304. The means for receiving may comprise a receiver, e.g., the receiver 254 from FIG. 2 or the receiver 312 from FIG. 3. The means for decoding and de-interleaving may comprise an application specific integrated circuit, e.g., the RX data processor 270 from FIG. 2 or the processor 304. The means for merging may comprise an application specific integrated circuit, e.g., the RX data processor 270 or the processor 304.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communications, comprising:
one or more encoders configured to encode data according orthogonal frequency division multiplexing to obtain encoded bits;
a stream parser configured to partition the encoded bits into a plurality of partitions of bits associated with a plurality of spatial streams;
a segment parser configured to segment each of the partitions of bits across two or four 40 megahertz (MHz) bandwidth segments;
a first circuit configured to down-clock signal samples associated with the segmented encoded bits by a factor;
a second circuit configured to select one or more inter-frame timing parameters utilized in transmitting the down-clocked signal samples, wherein the one or more inter-frame timing parameters comprise at least one of a Clear Channel Assessment (CCA)-Time, a RxTx-Turnaround-Time, an Air-Propagation-Time, a Medium Access Control (MAC)-Processing-Delay, a Slot-Time, a Short Inter-Frame Space (SIFS) time, or a Distributed Inter-Frame Space (DIFS); and
a transmitter configured to transmit the down-clocked signal samples utilizing a plurality of waveforms in accordance with a communication standard configured for utilizing television (TV) whitespace.

2. The apparatus of claim 1, wherein:
the plurality of waveforms comprises 802.11ac based waveforms,
each of the segments is carried in a 40 MHz 802.11ac waveform of the plurality of waveforms, and
the data are populated on 108 of 128 subcarriers in each of the 40 MHz segments.

3. The apparatus of claim 1, wherein the segment parser configured to segment that partition of bits belonging to a spatial stream of the plurality of spatial streams across the two or four 40 MHz segments comprises:
a third circuit configured to assign each of the bits of the spatial stream to each of the segments in a round robin fashion.

4. The apparatus of claim 1, wherein the segment parser configured to segment that partition of bits comprises:
a third circuit configured to assign each sequence of bits of a first size of that partition to each of the segments in round robin manner, until all the bits in that partition are assigned or a number of remaining unassigned bits is less than the first size, and
the third circuit is also configured to assign each sequence of bits of a second size of the remaining unassigned bits to each of the segments in round robin manner until all the bits in that partition are assigned, if the number of remaining unassigned bits is not zero.

5. The apparatus of claim 4, wherein:
the first size is based on at least one of a number of the 40 MHz bandwidth segments, a number of the encoders, or a number of bits per sub-carrier per spatial stream of the plurality of spatial streams,
the second size is based on the number of bits per sub-carrier per spatial stream, and
the second size is smaller than the first size.

6. The apparatus of claim 1, further comprising:
an interleaver configured to interleave the bits of a segment of the two or four segments across 108 subcarriers of a 40 MHz 802.11ac waveform of the plurality of waveforms, wherein
the interleaver comprises a 40 MHz 802.11ac interleaver, and the one or more encoders comprise one or more Binary Convolutional Code (BCC) encoders.

7. The apparatus of claim 1, further comprising four distinct processing chains, wherein:
each of the processing chains is assigned to one of the 40 MHz bandwidth segments, and
each of the processing chains is identical to a transmit chain associated with 40 MHz 802.11ac transmission.

8. The apparatus of claim 1, wherein the transmitter is also configured to:
transmit the down-clocked signal samples over two separate 5 MHz bandwidth carriers, or over four separate 5 MHz bandwidth carriers where the factor is 8, or over two or four separate 6 MHz bandwidth carriers where the factor is 40/6, or over two or four separate 7 MHz bandwidth carriers where the factor is 40/7, or over two or four separate 8 MHz bandwidth carriers where the factor is 5.

9. The apparatus of claim 1, wherein:
the CCA-Time inter-frame timing parameter equals 32 µs, the RxTx-Turnaround-Time inter-frame timing parameter equals 2 µs, the Air-Propagation-Time inter-frame timing parameter equals 1 µs, the MAC-Processing-Delay inter-frame timing parameter equals 2 µs, the Slot-Time equal to 37 µs, the SIFS time inter-frame timing parameter equals 37 µs, or the DIFS time inter-frame timing parameter equals 111 µs, and
the down-clocked signal samples are transmitted over 5 MHz bandwidth carriers.

10. The apparatus of claim 1, wherein:
the CCA-Time inter-frame timing parameter equals 27 µs, the RxTx-Turnaround-Time inter-frame timing parameter equals 2 µs, the Air-Propagation-Time inter-frame timing parameter equals 1 µs, the MAC-Processing-Delay inter-frame timing parameter equals 2 µs, the Slot-Time inter-frame timing parameter equals 32 µs, the SIFS time inter-frame timing parameter equals 32 µs, or the DIFS time inter-frame timing parameter equals 96 µs, and
the down-clocked signal samples are transmitted over 6 MHz bandwidth carriers.

11. The apparatus of claim 1, wherein:
the CCA-Time inter-frame timing parameter equals 23 µs, the RxTx-Turnaround-Time inter-frame timing parameter equals 2 µs, the Air-Propagation-Time inter-frame timing parameter equals 1 µs, the MAC-Processing-Delay inter-frame timing parameter equals 2 µs, the Slot-Time inter-frame timing parameter equals 28 µs, the SIFS time equal to 28 µs, or the DIFS time inter-frame timing parameter equals 84 µs, and
the down-clocked signal samples are transmitted over 7 MHz bandwidth carriers.

12. The apparatus of claim 1, wherein:
the CCA-Time inter-frame timing parameter equals 20 µs, the RxTx-Turnaround-Time inter-frame timing parameter equals 2 µs, Air-Propagation-Time inter-frame timing parameter equals 1 µs, the MAC-Processing-Delay inter-frame timing parameter equals 2 µs, the Slot-Time inter-frame timing parameter equals 25 µs, the SIFS time inter-frame timing parameter equals 25 µs, or the DIFS time inter-frame timing parameter equals 75 µs, and
the down-clocked signal samples are transmitted over 8 MHz bandwidth carriers.

13. The apparatus of claim 1, further comprising:
a third circuit configured to indicate the transmission across the two or four 40 MHz segments by utilizing one or more bits of a Very High Throughput Signal field type A (VHT-SIGA field) of a preamble of the transmission.

14. A method for wireless communications, comprising:
encoding data according to orthogonal frequency division multiplexing to obtain encoded bits;
partitioning the encoded bits into a plurality of partitions of bits associated with a plurality of spatial streams;
segmenting each of the partitions of bits across two or four 40 megahertz (MHz) bandwidth segments;
down-clocking signal samples associated with the segmented encoded bits by a factor;
selecting one or more inter-frame timing parameters utilized in transmitting the down-clocked signal samples, wherein the one or more inter-frame timing parameters comprise at least one of a Clear Channel Assessment (CCA)-Time, a RxTx-Turnaround-Time, an Air-Propagation-Time, a Medium Access Control (MAC)-Processing-Delay, a Slot-Time, a Short Inter-Frame Space (SIFS) time, or a Distributed Inter-Frame Space (DIFS); and
transmitting the down-clocked signal samples utilizing a plurality of waveforms in accordance with a communication standard configured for utilizing television (TV) whitespace.

15. The method of claim 14, wherein:
the plurality of waveforms comprises 802.11ac based waveforms,
each of the segments is carried in a 40 MHz 802.11ac waveform of the plurality of waveforms, and
the data are populated on 108 of 128 subcarriers in each of the 40 MHz bandwidth segments.

16. The method of claim 14, further comprising:
assigning each of the bits of the spatial stream to each of the segments in a round robin fashion.

17. The method of claim 14, further comprising:
assigning each sequence of bits of a first size of that partition to each of the segments in round robin manner, until all the bits in that partition are assigned or a number of remaining unassigned bits is less than the first size, and
assigning each sequence of bits of a second size of the remaining unassigned bits to each of the segments in round robin manner until all the bits in that partition are assigned, if the number of remaining unassigned bits is not zero.

18. The method of claim 17, wherein:
the first size is based on at least one of a number of the 40 MHz bandwidth segments, a number of encoders for encoding data, or a number of bits per sub-carrier per spatial stream of the plurality of spatial streams,
the second size is based on the number of bits per sub-carrier per spatial stream, and
the second size is smaller than the first size.

19. The method of claim 14, further comprising:
interleaving the bits of a segment of the two or four segments across 108 subcarriers of a 40 MHz 802.11ac waveform of the plurality of waveforms, wherein
encoding comprises Binary Convolutional Code (BCC) based encoding.

20. The method of claim 14, further comprising:
processing the data utilizing four distinct processing chains, wherein:
each of the processing chains is assigned to one of the 40 MHz bandwidth segments, and
each of the processing chains is identical to a transmit chain associated with 40 MHz 802.11ac transmission.

21. The method of claim 14, further comprising:
transmitting the down-clocked signal samples over two separate 5 MHz bandwidth carriers, or over four separate 5 MHz bandwidth carriers where the factor is 8, or over two or four separate 6 MHz bandwidth carriers where the factor is 40/6, or over two or four separate 7 MHz bandwidth carriers where the factor is 40/7, or over two or four separate 8 MHz bandwidth carriers where the factor is 5.

22. The method of claim 14, wherein:
the CCA-Time inter-frame timing parameter equals 32 µs, the RxTx-Turnaround-Time inter-frame timing parameter equals 2 µs, the Air-Propagation-Time inter-frame timing parameter equals 1 µs, the MAC-Processing-Delay inter-frame timing parameter equals 2 µs, the Slot-Time equal to 37 µs, the SIFS time inter-frame timing parameter equals 37 µs, or the DIFS time inter-frame timing parameter equals 111 µs, and
the down-clocked signal samples are transmitted over 5 MHz bandwidth carriers.

23. The method of claim 14, wherein:
the CCA-Time inter-frame timing parameter equals 27 µs, the RxTx-Turnaround-Time inter-frame timing parameter equals 2 µs, the Air-Propagation-Time inter-frame timing parameter equals 1 µs, the MAC-Processing-Delay inter-frame timing parameter equals 2 µs, the Slot-Time inter-frame timing parameter equals 32 µs, the SIFS time inter-frame timing parameter equals 32 µs, or the DIFS time inter-frame timing parameter equals 96 µs, and
the down-clocked signal samples are transmitted over 6 MHz bandwidth carriers.

24. The method of claim 14, wherein:
the CCA-Time inter-frame timing parameter equals 23 µs, the RxTx-Turnaround-Time inter-frame timing parameter equals 2 µs, the Air-Propagation-Time inter-frame timing parameter equals 1 µs, the MAC-Processing-Delay inter-frame timing parameter equals 2 µs, the Slot-Time inter-frame timing parameter equals 28 µs, the SIFS time equal to 28 µs, or the DIFS time inter-frame timing parameter equals 84 µs, and
the down-clocked signal samples are transmitted over 7 MHz bandwidth carriers.

25. The method of claim 14, wherein:
the CCA-Time inter-frame timing parameter equals 20 µs, the RxTx-Turnaround-Time inter-frame timing parameter equals 2 µs, Air-Propagation-Time inter-frame timing parameter equals 1 µs, the MAC-Processing-Delay inter-frame timing parameter equals 2 µs, the Slot-Time inter-frame timing parameter equals 25 µs, the SIFS time inter-frame timing parameter equals 25 µs, or the DIFS time inter-frame timing parameter equals 75 µs, and
the down-clocked signal samples are transmitted over 8 MHz bandwidth carriers.

26. The method of claim 14, further comprising:
indicating the transmission across the two or four 40 MHz segments by utilizing one or more bits of a Very High Throughput Signal field type A (VHT-SIGA field) of a preamble of the transmission.

27. An apparatus for wireless communications, comprising:
means for encoding data according orthogonal frequency division multiplexing to obtain encoded bits;
means for partitioning the encoded bits into a plurality of partitions of bits associated with a plurality of spatial streams;
means for segmenting each of the partitions of bits across two or four 40 megahertz (MHz) bandwidth segments;
means for down-clocking signal samples associated with the segmented encoded bits by a factor;
means for selecting one or more inter-frame timing parameters utilized in transmitting the down-clocked signal samples, wherein the one or more inter-frame timing parameters comprise at least one of a Clear Channel Assessment (CCA)-Time, a RxTx-Turnaround-Time, an Air-Propagation-Time, a Medium Access Control (MAC)-Processing-Delay, a Slot-Time, a Short Inter-Frame Space (SIFS) time, or a Distributed Inter-Frame Space (DIFS); and
means for transmitting the down-clocked signal samples utilizing a plurality of waveforms in accordance with a communication standard configured for utilizing television (TV) whitespace.

28. The apparatus of claim 27, wherein:
the plurality of waveforms comprises 802.11ac based waveforms,
each of the segments is carried in a 40 MHz 802.11ac waveform of the plurality of waveforms, and
the data are populated on 108 of 128 subcarriers in each of the 40 MHz bandwidth segments.

29. The apparatus of claim 27, further comprising:
means for assigning each of the bits of the spatial stream to each of the segments in a round robin fashion.

30. The apparatus of claim 27, further comprising:
means for assigning each sequence of bits of a first size of that partition to each of the segments in round robin manner, until all the bits in that partition are assigned or a number of remaining unassigned bits is less than the first size, and
means for assigning each sequence of bits of a second size of the remaining unassigned bits to each of the segments in round robin manner until all the bits in that partition are assigned, if the number of remaining unassigned bits is not zero.

31. The apparatus of claim 30, wherein:
the first size is based on at least one of a number of the 40 MHz bandwidth segments, a number of encoders for encoding data, or a number of bits per sub-carrier per spatial stream of the plurality of spatial streams,
the second size is based on the number of bits per subcarrier per spatial stream, and
the second size is smaller than the first size.

32. The apparatus of claim 27, further comprising:
means for interleaving the bits of a segment of the two or four segments across 108 subcarriers of a 40 MHz 802.11 ac waveform of the plurality of waveforms, wherein
encoding comprises Binary Convolutional Code (BCC) based encoding.

33. The apparatus of claim 27, further comprising four distinct processing chains, wherein:

each of the processing chains is assigned to one of the 40 MHz bandwidth segments, and
each of the processing chains is identical to a transmit chain associated with 40 MHz 802.11ac transmission.

34. The apparatus of claim 27, wherein the means for transmitting is further configured to:
transmit the down-clocked signal samples over two separate 5 MHz bandwidth carriers, or over four separate 5 MHz bandwidth carriers where the factor is 8, or over two or four separate 6 MHz bandwidth carriers where the factor is 40/6, or over two or four separate 7 MHz bandwidth carriers where the factor is 40/7, or over two or four separate 8MHz bandwidth carriers where the factor is 5.

35. The apparatus of claim 27, wherein:
the CCA-Time inter-frame timing parameter equals 32 μs, the RxTx-Turnaround-Time inter-frame timing parameter equals 2 μs, the Air-Propagation-Time inter-frame timing parameter equals 1 μs, the MAC-Processing-Delay inter-frame timing parameter equals 2 μs, the Slot-Time equal to 37 μs, the SIFS time inter-frame timing parameter equals 37 μs, or the DIFS time inter-frame timing parameter equals 111 μs, and
the down-clocked signal samples are transmitted over 5 MHz bandwidth carriers.

36. The apparatus of claim 27, wherein:
the CCA-Time inter-frame timing parameter equals 27 μs, the RxTx-Turnaround-Time inter-frame timing parameter equals 2 μs, the Air-Propagation-Time inter-frame timing parameter equals 1 μs, the MAC-Processing-Delay inter-frame timing parameter equals 2 μs, the Slot-Time inter-frame timing parameter equals 32 μs, the SIFS time inter-frame timing parameter equals 32 μs, or the DIFS time inter-frame timing parameter equals 96 μs, and
the down-clocked signal samples are transmitted over 6 MHz bandwidth carriers.

37. The apparatus of claim 27, wherein:
the CCA-Time inter-frame timing parameter equals 23 μs, the RxTx-Turnaround-Time inter-frame timing parameter equals 2 μs, the Air-Propagation-Time inter-frame timing parameter equals 1 μs, the MAC-Processing-Delay inter-frame timing parameter equals 2 μs, the Slot-Time inter-frame timing parameter equals 28 μs, the SIFS time equal to 28 μs, or the DIFS time inter-frame timing parameter equals 84 μs, and
the down-clocked signal samples are transmitted over 7 MHz bandwidth carriers.

38. The apparatus of claim 27, wherein:
the CCA-Time inter-frame timing parameter equals 20 μs, the RxTx-Turnaround-Time inter-frame timing parameter equals 2 μs, Air-Propagation-Time inter-frame timing parameter equals 1 μs, the MAC-Processing-Delay inter-frame timing parameter equals 2 μs, the Slot-Time inter-frame timing parameter equals 25 μs, the SIFS time inter-frame timing parameter equals 25 μs, or the DIFS time inter-frame timing parameter equals 75 μs, and
the down-clocked signal samples are transmitted over 8 MHz bandwidth carriers.

39. The apparatus of claim 27, further comprising:
means for indicating the transmission across the two or four 40 MHz bandwidth segments by utilizing one or more bits of a Very High Throughput Signal field type A (VHT-SIGA field) of a preamble of the transmission.

40. A non-transitory computer-readable medium containing instructions, which when executed by a processor perform the operations of:

encoding data according to orthogonal frequency division multiplexing to obtain encoded bits;

partitioning the encoded bits into a plurality of partitions of bits associated with a plurality of spatial streams;

segmenting each of the partitions of bits across two or four 40 megahertz (MHz) bandwidth segments;

down-clocking signal samples associated with the segmented encoded bits by a factor;

selecting one or more inter-frame timing parameters utilized in transmitting the down-clocked signal samples, wherein the one or more inter-frame timing parameters comprise at least one of a Clear Channel Assessment (CCA)-Time, a RxTx-Turnaround-Time, an Air-Propagation-Time, a Medium Access Control (MAC)-Processing-Delay, a Slot-Time, a Short Inter-Frame Space (SIFS) time, or a Distributed Inter-Frame Space (DIFS); and transmitting the down-clocked signal samples utilizing a plurality of waveforms in accordance with a communication standard configured for utilizing television (TV) whitespace.

41. An access point, comprising:

at least one antenna;

one or more encoders configured to encode data according to orthogonal frequency division multiplexing to obtain encoded bits;

a stream parser configured to partition the encoded bits into a plurality of partitions of bits associated with a plurality of spatial streams;

a segment parser configured to segment each of the partitions of bits across two or four 40 megahertz (MHz) bandwidth segments;

a first circuit configured to down-clock signal samples associated with the segmented encoded bits by a factor;

a second circuit configured to select one or more inter-frame timing parameters utilized in transmitting the down-clocked signal samples, wherein the one or more inter-frame timing parameters comprise at least one of a Clear Channel Assessment (CCA)-Time, a RxTx-Turnaround-Time, an Air-Propagation-Time, a Medium Access Control (MAC)-Processing-Delay, a Slot-Time, a Short Inter-Frame Space (SIFS) time, or a Distributed Inter-Frame Space (DIFS); and a transmitter configured to transmit the down-clocked signal samples utilizing a plurality of waveforms in accordance with a communication standard configured for utilizing television (TV) whitespace.

42. An apparatus for wireless communications, comprising:

a receiver configured to receive a waveform comprising a plurality of indexed spatial streams, wherein each of the streams is carried on two or four separate segments of a first size, the received waveform comprising a waveform in accordance with a communication standard configured for utilizing television (TV) whitespace, and the first size comprising 5 megahertz (MHz) bandwidth, 6 MHz bandwidth, 7 MHz bandwidth, or 8 MHz bandwidth;

a first circuit configured to decode and de-interleave bits of each of the plurality of spatial streams in each of the two or four separate segments of the first size according to orthogonal frequency division multiplexing, wherein decoding and de-interleaving comprise decoding and de-interleaving in accordance with 40 MHz orthogonal frequency division multiplexing;

a second circuit configured to merge the bits corresponding to a same spatial stream index of the plurality of indexed spatial streams from constituent bits of the spatial stream index in the two or four separate segments of the first size; and a third circuit configured to merge the bits of separate spatial streams of the plurality of spatial streams to obtain a received data bit stream.

43. The apparatus of claim 42, wherein:

the received waveform comprises an 802.11af based waveform.

44. A method for wireless communications, comprising:

receiving a waveform comprising a plurality of indexed spatial streams, wherein each of the streams is carried on two or four separate segments of a first size, the received waveform comprising a waveform in accordance with a communication standard configured for utilizing television (TV) whitespace, and the first size comprising 5 megahertz (MHz) bandwidth, 6 MHz bandwidth, 7 MHz bandwidth, or 8 MHz bandwidth;

decoding and de-interleaving bits of each of the plurality of spatial streams in each of the two or four separate segments of the first size according to orthogonal frequency division multiplexing, wherein decoding and de-interleaving comprise decoding and de-interleaving in accordance with 40 MHz orthogonal frequency division multiplexing;

merging the bits corresponding to a same spatial stream index of the plurality of indexed spatial streams from constituent bits of the spatial stream index in the two or four separate segments of the first size; and merging the bits of separate spatial streams of the plurality of spatial streams to obtain a received data bit stream.

45. The method of claim 44, wherein:

the received waveform comprises an 802.11af based waveform.

46. An apparatus for wireless communications, comprising:

means for receiving a waveform comprising a plurality of indexed spatial streams, wherein each of the streams is carried on two or four separate segments of a first size, the received waveform comprising a waveform in accordance with a communication standard configured for utilizing television (TV) whitespace, and the first size comprising 5 megahertz (MHz) bandwidth, 6 MHz bandwidth, 7 MHz bandwidth, or 8 MHz bandwidth;

means for decoding and de-interleaving bits of each of the plurality of spatial streams in each of the two or four separate segments of the first size according to orthogonal frequency division multiplexing, wherein decoding and de-interleaving comprise decoding and de-interleaving in accordance with 40 MHz orthogonal frequency division multiplexing;

means for merging the bits corresponding to a same spatial stream index of the plurality of indexed spatial streams from constituent bits of the spatial stream index in the two or four separate segments of the first size;

means for merging the bits of separate spatial streams of the plurality of spatial streams to obtain a received data bit stream.

47. The apparatus of claim 46, wherein:

the received waveform comprises an 802.11af based waveform.

48. A non-transitory computer-readable medium containing instructions, which when executed by a processor perform the operations of:

receiving a waveform comprising a plurality of indexed spatial streams, wherein each of the streams is carried on two or four separate segments of a first size, the received waveform comprising a waveform in accordance with a communication standard configured for utilizing television (TV) whitespace, and the first size comprising 5 megahertz (MHz) bandwidth, 6 MHz bandwidth, 7 MHz bandwidth, or 8 MHz bandwidth;

decoding and de-interleaving bits of each of the plurality of spatial streams in each of the two or four separate segments of the first size according to orthogonal frequency division multiplexing, wherein decoding and de-interleaving comprise decoding and de-interleaving in accordance with 40 MHz orthogonal frequency division multiplexing;

merging the bits corresponding to a same spatial stream index of the plurality of indexed spatial streams from constituent bits of the spatial stream index in the two or four separate segments of the first size; and merging the bits of separate spatial streams of the plurality of spatial streams to obtain a received data bit stream.

49. An access terminal, comprising:

at least one antenna;

a receiver configured to receive, via the at least one antenna, a waveform comprising a plurality of indexed spatial streams, wherein each of the streams is carried on two or four separate segments of a first size, the received waveform comprising a waveform in accordance with a communication standard configured for utilizing television (TV) whitespace, and the first size comprising 5 megahertz (MHz) bandwidth, 6 MHz bandwidth, 7 MHz bandwidth, or 8 MHz bandwidth;

a first circuit configured to decode and de-interleave bits of each of the plurality of spatial streams in each of the two or four separate segments of the first size according to orthogonal frequency division multiplexing, wherein decoding and de-interleaving comprise decoding and de-interleaving in accordance with 40 MHz orthogonal frequency division multiplexing;

a second circuit configured to merge the bits corresponding to a same spatial stream index of the plurality of indexed spatial streams from constituent bits of the spatial stream index in the two or four separate segments of the first size; and a third circuit configured to merge the bits of separate spatial streams of the plurality of spatial streams to obtain a received data bit stream.

\* \* \* \* \*